Aug. 25, 1964   R. GILMONT   3,145,569
OPEN END McLEOD-TYPE GAUGE AND METHOD
Filed Sept. 29, 1960
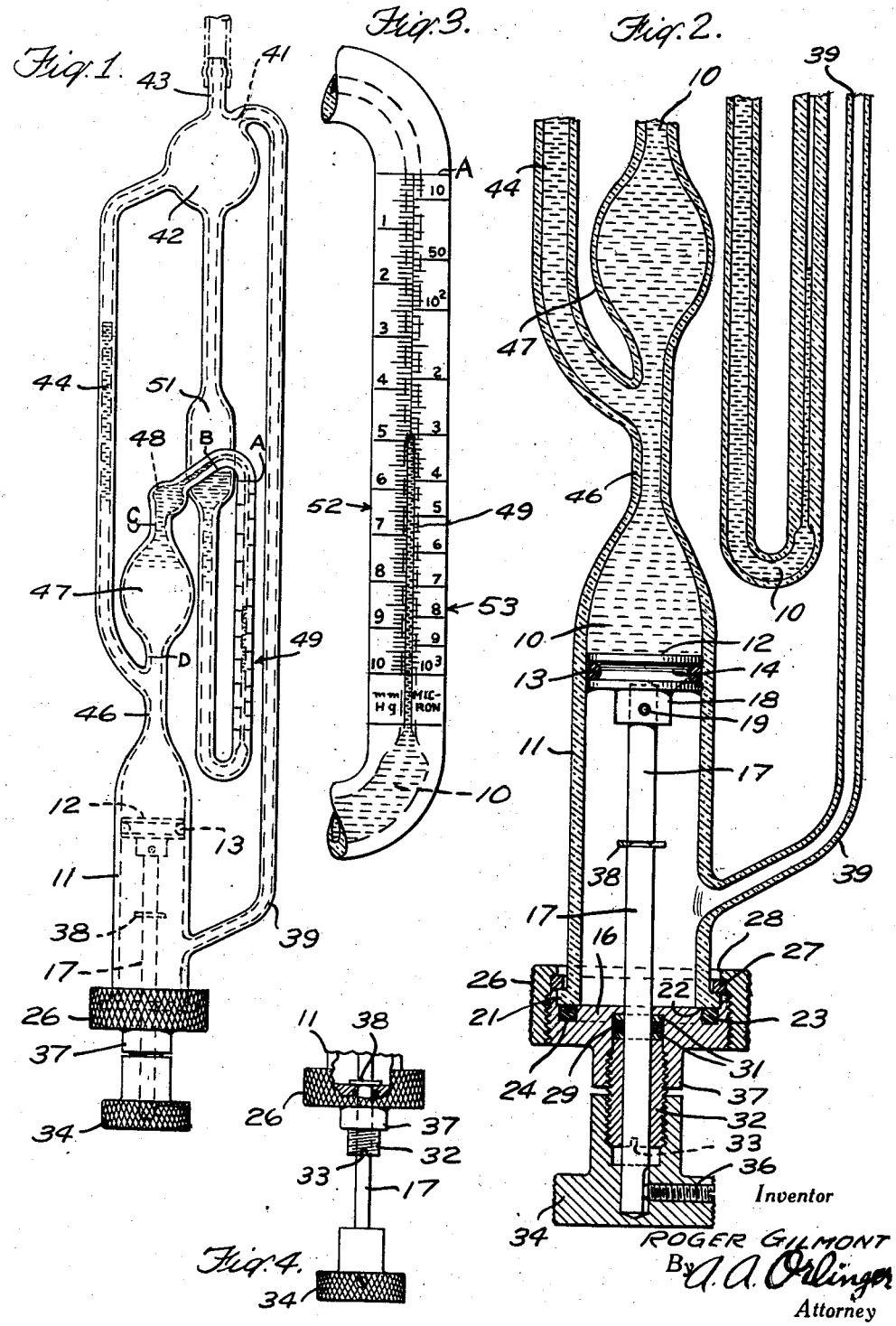
Inventor
ROGER GILMONT
By A. A. Orlinger
Attorney

United States Patent Office 3,145,569
Patented Aug. 25, 1964

3,145,569
OPEN END McLEOD-TYPE GAUGE
AND METHOD
Roger Gilmont, Douglaston, N.Y., assignor to Monostat Corporation, New York, N.Y.
Filed Sept. 29, 1960, Ser. No. 59,269
8 Claims. (Cl. 73—400)

This invention is that of a McLeod-type gauge for measuring the absolute pressure of attenuated gaseous fluids (i.e. gases and vapors), but which is free of the disadvantages of McLeod gauges. More specifically, the invention is that of a McLeod-type gauge for that purpose, but comprising an open end measuring capillary in place of a closed end one as is found in the ordinary McLeod gauge and the various modifications of it, and also having a piston movable within a limited volume reservoir and operable from outside of it for adjusting the mercury or other compressing liquid level.

The invention includes also the method of measuring the absolute pressure of an attenuated gaseous fluid, which comprises (a) collecting or trapping a specific volume of said gaseous fluid (at its unknown attenuated pressure to be determined) between the opposed menisci of two separated portions of a non-volatile and inert compressing liquid (as defined below), said gaseous fluid and both portions of compressing liquid being confined between a continuous encircling confining area or wall, within which the gaseous fluid and both liquid portions are longitudinally axially movable, and the known volume of gaseous fluid is determined by the respective relative initial or starting locations of the two menisci, the first of them (i.e. that of one or the first liquid portion) being at a lower level than that of the second meniscus (i.e. that of the other or second liquid portion); (b) exposing the other end of the second liquid portion to the unknown pressure of the gaseous fluid; (c) applying pressure on the first liquid portion thereby to move the first meniscus toward the second one and thus compress the gaseous fluid between them, and continuing to apply said pressure until the first meniscus reaches a selected stopping location which determines a known reference volume between it and the starting location of the second meniscus, said compression of the gaseous fluid also resulting in moving the second meniscus from its starting location to a final location for it when the first meniscus reaches its selected stopping location; and (d) noting the extent of displacement of the second meniscus.

The initial pressure of the attenuated gaseous fluid then readily is determined from a simple algebraic relationship between the specific volume of gaseous fluid initially trapped or collected, the volumetric and linear displacements of the second liquid portion, and the reference volume between the stopping location of the first meniscus and initial location of the second meniscus. That simple relationship is expressed at page 11 below.

In the apparatus of the invention, the continuous encircling confining area or wall around the two portions of compressing liquid, between which the initial specific volume of trapped gaseous fluid is held, is a continuous conduit or tubing. In its portion wherein the second meniscus is moved from its initial to each final location for it for each respective use, advantageously is a precision bore capillary. On that tubing enclosing this capillary is affixed an indicating scale. From the simple algebraic relationship mentioned above, the graduations on the scale can be made to correspond to the actual absolute pressures to be indicated.

Accordingly, with the aid of the above referred to simple algebraic relationship, an important feature of the invention is its McLeod-type gauge which has associated with its measuring capillary a scale from which there can be read directly the absolute pressure of an attenuated gaseous fluid.

By "non-volatile and inert compressing liquid," as used herein and in the appended claims, is meant a liquid employed to compress the trapped specific volume or sample of gaseous fluid whose attenuated pressure is to be determined, which liquid does not volatilize into the conduits or tubing in which it is confined and does not react with, or dissolve, the gaseous fluid or volatilize into it, all at the ambient atmospheric conditions in the particular place where the gauge is being used.

A principal drawback of the conventional McLeod gauge is in its closed end capillary. Perhaps the greatest difficulty encountered in the use of such gauge is the annoying and frustrating problem of maintaining its closed capillary clean and keeping it free of mercury slugs. Another disadvantage lies in the problems encountered with raising and lowering the mercury level for compressing the trapped volume of attenuated gas.

The usual structural embodiments for compressing the trapped gas in the McLeod gauges manifest the following respective shortcomings:

i. The barometric plunger type provides a device that is too long (or high) and clumsy in handling.

ii. The leveling bulb type is even more clumsy in handling than the plunger type, not to stress its danger of spilling.

iii. The tilting type requires a flexible connection to the system, and also is quite difficult to adjust in the endeavor to obtain accurate readings.

iv. The auxiliary vacuum type requires the necessary additional source of vacuum, and also is difficult to adjust precisely.

These and other shortcomings, disadvantages and drawbacks in the different embodiments of the conventional McLeod gauge are avoided by the attenuated gaseous fluids absolute pressure measuring device of this invention.

In addition to its open end capillary, a feature of the invention is that the open end capillary serves as one leg of a loop or U-shaped manometer, the other leg of which communicates with a super-imposed well, and then through a conduit to the attenuated gas system.

Another feature of the gauge of the invention is compactness provided by the limited volume reservoir needed for the major operating portion of the compressing liquid.

A further important feature of the gauge of the invention is its balanced piston mounted for smooth and easy translation to and fro in the precision bore reservoir, and a threaded stud to receive the piston rod handle and thereby enable rapid yet smooth micrometric adjustment of the operating meniscus.

Still another significant feature resides in the compression of the trapped gas sample between two meniscuses of the compression liquid (such as mercury) and the provision on the single tube open end capillary of an indicator scale that enables direct reading of the absolute pressure.

Yet a further feature is the elimination of the need for a comparison capillary by the utility of the open end single tube capillary.

The invention is more fully explained by the detailed description below of an illustrative, but not limiting, embodiment of it shown in the accompanying drawings wherein FIG. 1 is a vertical elevation of the complete gauge of the invention.

FIG. 2 is an enlarged vertical sectional view through the axis of the cylindrical parts of the pressure determining parts of FIG. 1, but with the piston and shaft not shown in section.

FIG. 3 is a still further enlarged fragmentary vertical view of the compressed gas volume measuring capillary and its pressure indicating scale.

FIG. 4 is an enlarged vertical view, partly in section, of the lower part of the reservoir, the support adapter for it, and the piston translating means.

Other features of the gauge of the invention will be noted from the following detailed description of this illustrative embodiment of it.

Referring to the drawings, and initially primarily to FIGS. 1 and 2, the non-volatile and inert compressing liquid, such as mercury, 10 is manipulated by imparting motion to its lower part which is confined in the operation reservoir 11, and movably supported upon the piston 12 longitudinally axially movable therein in liquid-tight contact with its inner wall. Such contact advantageously is provided by the liquid-tightly to and fro movable engagement of that inner wall by a peripheral seal about the piston such as an O-ring seal 13 of a firmly resilient material inert to the compressing liquid, such as a rubber O-ring, seated in the annular groove 14 about the periphery of piston 12.

Reservoir 11 can be made of any fluid-impermeable material that is adequately strong enough for its purpose and to be continuous with the other compressing liquid confining parts of the gauge. Beneficially, reservoir 11 and all other such parts of the gauge can be of any suitably working transparent material with sufficient strength for the specific function to be served. So far as presently indicated such parts advantageously can be made of glass of adequate thickness and specifications.

Thus, reservoir 11, for example, can be made of glass tubing of smooth enough bore to permit liquid-tight to and fro movable contact between it and the peripheral seal about piston 12. Advantageously, the glass reservoir 11 is made of medium wall precision bore 'Pyrex' tubing and conveniently of one inch inside diameter, although it is not limited to that size. Such rubber O-ring sealed piston operating in such precision bore tube permits rapid yet smoothly controlled operation and precise readings together with advantageous compactness.

Reservoir 11 is gas-tightly closed at its lower end and advantageously at its bottom by being locked to an adapter-support 16. Through the latter there extends co-axially longitudinally movable therethrough piston-rod 17, the upper end of which fits into hub 18 depending from piston 12 which then is removably affixed to rod 17 by set screw 19.

Gas-tight closure of reservoir 11 against adapter-support 16 is obtained by providing reservoir 11 at its lower end with an outwardly extending flange 21, beneficially with its under-surface 22 polished flat, and pulling surface 22 tightly against the flat top surface of support 16 so as to gas-tightly compress a sealing ring, such as rubber O-ring 23, in annular groove 24 in the top of support 16, and by screwing the inside threaded adapter-nut 26 over the outside threads of adapter-support 16 tightly to compress a gasket, preferably slit "Teflon" ring 27 (for its friction-overcoming character), between inwardly extending flange 28 of nut 26 and flange 21 of reservoir 11.

Piston-rod 17 is supported gas-tightly yet axially longitudinally movable in adapter-support 16 by a dependable vacuum seal, composed advantageously of the rubber O-ring 29 flanked on each side by a "Teflon" ring 31. These three rings fit snugly in a downwardly facing hole in the underside of adapter-support 16.

Support-hub 37 depends from support 16 and is interiorly threaded in a size to avoid blocking removal of sealing rings 29 and 31, but which threads yet are screwably engageable by the outer threads of the upper part, preferably upper half, of sleeve stud 32. The latter is screwed snugly against the bottom of the lower ring 31 by applying a screw driver in slot 33. Piston-rod 17 extends rotatably through and below rings 29 and 31 and sleeve-stud 32 and is lubricated by a suitable non-volatile silicon grease. Piston-rod handle 34 is threaded over the lower half of sleeve-stud 32 and covers the end of rod 17, being removably locked to its end by set screw 36.

Turning of the threads of sleeve-stud 32 in the threads of support-hub 37 enables micrometer adjustment of piston-rod 17 in the end of its travel. However, handle 34 can be turned enough to disengage the sleeve-stud threads from those of hub 37 to give piston-rod 17 freer longitudinally axial movement through the vacuum sealing rings 29 and 31. U-spring withdrawal stop 38 is set in an annular groove about piston-rod 17 at such a level to prevent lowering piston 12 to the junction of equalizing tube 39 with reservoir 11.

To provide good wearing and freedom from corrosion, the piston, piston-rod, piston stop, and sleeve-stud can be made of stainless steel. For adequate fluid-tight seal with the bottom of reservoir 11 and to avoid scratching the glass, adapter-support 16 can be of anodized aluminum, of which adapter-nut 26 and handle 34 also can be made. The latter may, however, be made of any suitable plastic material.

Equalizer tube 39 (conveniently of one-quarter inch medium wall "Pyrex" tubing) communicates through a restricted opening 41 with the upper part of the interior of trap 42 (conveniently about thirty-five millimeters inside diameter), from the upper, preferably the uppermost, part of which there extends system connection 43. The latter communicates with the source of the attenuated gaseous fluid whose absolute pressure is to be determined.

The upper part of reservoir 11 is reduced to conveniently a short joining length 46 of, say, three-eighths inch heavy wall "Pyrex" tubing, the lower part of which communicates into an intermediate junction with trap 42 through connecting tube 44 conveniently of the foregoing size and weight tubing.

The level in joining length 46 immediately above its junction with connecting tube 44 conveniently is called reference level or cut-off point D (because, as will be noted below, that is where there is cut-off the specific volume of attenuated gaseous fluid collected for test).

Closely above cut-off point D is connected the large compression chamber or bulb 47 which, in this specific embodiment, from cut-off point D to reference or fiduciary mark C, has a volume of 11.50 milliliters.

At reference mark C, by capillary tubing of, say 3.5 millimeters inside diameter, there is connected the small compression bulb 48. It connects by a short branch bend of capillary tubing with pressure measuring capillary 49. Both of these capillaries suitably are "Pyrex" capillary tubing with outside diameter of 7 to 8 millimeters and with precision bore capillary having a diameter of 1.153 millimeters (using 0.0454 inch drill rod).

About the highest level in the vertical portion of capillary 49 is designated as reference level A. Reference location B is set at a location where the volume between reference marks A and B is 0.020 millimeter. The volume for the small compression bulb 48 and tubing between reference marks B and C is 1.015 milliliters.

The bottom end of pressure measuring capillary 49 joins a length of, say, three-eighths inch heavy wall "Pyrex" tubing bent around to complete a U-shape with capillary 49, and connecting at its upper end with well 51 which in turn communicates by similar tubing with the bottom of trap 42, and conveniently is made from nineteen millimeter outside diameter standard "Pyrex" tubing.

*Method of operation.*—With piston 12 in its relatively fully raised position (i.e. just below the beginning of the restricted cross-section of the upper part of reservoir 11) and the gauge held vertical, clean dry compression liquid, preferably mercury, carefully is fed into trap 42 through open system connection 43. The mercury runs down into well 51 and the length of tubing forming the U-shape with capillary 49, up the latter and siphons over through compression bulbs 48 and 47 into reservoir 11 above piston 12, and into connecting tube 44 to the same level as the mercury in capillary 49. No more mercury is added; and the siphon in the short branch bend generally automatically breaks.

Handle 34 then is turned to unscrew it from sleeve-stud 32 and enable piston rod 17 to be lowered freely, and thus breaking the siphon in the short branch bend between reference level A and small bulb 48. Piston 12 then is lowered until the first meniscus (i.e. on its side of the device) falls below the junction of connecting tube 44 with joining length 46.

When the siphon is broken, the second meniscus (i.e. top of the mercury column in pressure measuring capillary 49) should be quite close to reference level A. If that meniscus is below A, mercury should be added to well 51 through trap 42 as before to raise the second meniscus to reference level A.

However, if the second meniscus is above level A, mercury should be removed from capillary 49, by tilting the device (to the right as viewed in the drawings) till mercury flows back through the compression bulbs and the short branch bend to re-establish the siphon, and then turning the device back to the vertical to draw off the excess from the top of capillary 49 and again to break the siphon.

With the second meniscus now at reference level A and the device in vertical position, it is connected to the system whose attenuated pressure is to be determined. When such sub-atmospheric pressure, i.e. vacuum, first is applied, initially any trapped gases in the mercury are liberated. After their removal, the device is ready for use to determine attenuated pressure.

Piston 12 now is raised in reservoir 11 by pushing up handle 34. As the first meniscus then passes the junction of connecting tube 44 and joining length 46 and thus reaches cut-off point D, there is collected or trapped in the device 11.50 plus 1.015 plus 0.020, or a total of 12.535, milliliters of the attenuated gas whose absolute pressure is to be determined.

When the threads of handle 34 engage the lowest thread of sleeve-stud 32, the thus trapped gas is partially compressed and the first meniscus should be slightly below fiduciary mark or reference level C. (If the meniscus is not at that level, the mercury can be manipulated to make the necessary adjustment by re-positioning the handle, if necessary, with required manipulation of its set screw 36. Alternatively or at the same time, the total amount of mercury in the reservoir can be adjusted to have that meniscus slightly below level C when the handle threads first engage the lowermost thread of stud 32.)

Handle 34 then is turned until the first meniscus reaches reference level C. If the level in measuring capillary 49 (as noted on coarse scale 52) to which the second meniscus is depressed is at a level representing less than one millimeter of mercury, handle 34 is turned further to raise the first meniscus and thus still more to compress the trapped gas until reference level B is reached. A more accurate reading then is made by noting on fine scale 53 (i.e. to the right of capillary 49) the reading indicated by the level of the second meniscus.

To enable making further attenuated pressure readings, handle 34 is turned in the opposite direction to withdraw its threads from engagement with those of stud 32 and then is pulled down until the first meniscus is lowered to just below the junction of connecting tube 44 and joining length 46. The procedure for trapping a new sample of attenuated gas and then compressing it and making another reading on the applicable scale is repeated.

As seen more clearly in FIG. 3, adjoining measuring capillary 49 on its left is coarse scale 52 with its graduations running from 1 through 10 millimeters of mercury and being further divided to read in tenths of a millimeter; and on its right is fine scale 53 reading in microns of mercury and reading from zero to one thousand microns. Each of these scales can be made of permanently fired-in contrasting color ceramic.

The locations of the graduations for these two different scales are arrived at from the following equation derived by application of Boyle's law to the coresponding measurements, thus:

$$P = \frac{(v_2 + ah)h}{(V - v_2 - ah)},$$

wherein $P$ = absolute pressure of the attenuated gas in the system;
$h$ = the distance dropped by the meniscus in capillary 49 from its zero level at A to its final level;
$V$ = volume of compression bulbs and tubing interior from D to A;
$v_2$ = volume of bulb and tubing interior from C to A; and
$a$ = cross-sectional area of measuring capillary 49.

The foregoing equation thus expresses the absolute pressure of the attenuated gas being tested in terms of drop in level of the meniscus in measuring capillary 49 (i.e. of the second meniscus) from its starting location or zero level.

Substituting in the foregoing equation the various numerical values given hereinabove for the volumes of the respective parts of the illustrative embodiment, calculations indicate that the coarse scale (on the left of the capillary 49) approaches a linear scale because the volume of the capillary is small compared with the final volume to which the gas is compressed.

For the fine scale (i.e. to the right of the capillary 49 and reading in microns), $v_2$ of the equation of P (i.e. pressure) is replaced by $v_1$ which is the volume of the small compression bulb 48 and the capillary interior from point B to A. Similar substitution of the disclosed numerical values indicates that the fine scale 53 approaches a square scale because the volume of the capillary approaches that of the final volume of the trapped gas after compression.

The mercury can be replaced, for example, by dibutyl phthalate or any other suitable non-volatile and inert compressing liquid. The volumes and shapes of the various chambers, and dimensions of the various tubing parts, of the device may be varied from those specifically used in the illustrative embodiment described in detail in relation to the drawings, so long as they still function as respectively disclosed for them, and with the necessary arrangement of the graduations on scales 52 and 53 to correspond with the selected changes in volumes and other dimensions.

The "Pyrex" glass parts can be replaced by any other suitably strong and fusable glass. The stainless steel parts can be replaced by any other corrosion resistant metal, and the anodized aluminum by any other metal that does not scratch glass. All of the O-rings, especially those in sliding contact uses, are best lubricated with a suitable non-volatile (i.e. under the ambient conditions) lubricant, e.g. a suitable silicone grease.

While the illustrative embodiment in the drawings has two compression bulbs, the device can have merely one, and then only one scale is needed for capillary 49. It is also possible for the device to have more than two compression bulbs, and in such case even more than two graduated scales with capillary 49. Generally compression bulb 47 can have about ten times the volume of compression bulb 48.

While the invention has been explained by giving a detailed description of the specific embodiment represented by that illustrated in the drawings, it is understood that various modifications and substitutions can be made therein within the scope of the appended claims which are intended also to embrace equivalents of the specific embodiment.

What is claimed is:

1. In the method of measuring absolute pressure of an attenuated gaseous fluid, the combination of steps which comprises trapping a specific volume of said attenuated gaseous fluid (at its unknown attenuated pressure to be determined) between the opposed meniscuses of two separated portions of a non-volatile and inert compressing liquid confined with said trapped gaseous fluid thus between them in a continuous conduit extending in opposite directions and communicating from each with the source body of said attenuated gaseous fluid whose pressure is being measured; allowing the opposed meniscus of a first one of said separate portions of compressing liquid to be at a lower starting level than the starting level of the exposed meniscus of the second portion of said liquid; exposing both of said opposed meniscuses and the remote meniscus of said second portion of said liquid to the same subatmospheric pressure as that of the source body of said attenuated gaseous fluid; the initial specific volume of the attenuated gas being determined by the respective relative starting locations of the opposed meniscuses; moving the first of said liquid portions in a manner to raise its opposed meniscus toward the opposed meniscus of the second one of them and thereby compressing the gaseous fluid trapped between them and leaving a remote meniscus of each of said compressing liquid portions exposed to said subatmospheric pressure of the source body of said gaseous fluid; continuing such compressing of the trapped gaseous fluid to reduce its volume to a smaller specific final compressed volume and with resultant depressing of the opposing meniscus of the second liquid portion from its starting level to a lower level for it when the trapped gaseous fluid has been compressed to said compressed volume; and using the difference from the starting level of said meniscus to its thus attained final lower level as an indication of the attenuated pressure of the gaseous fluid when originally trapped.

2. The combination of steps as claimed in claim 1, wherein pressure is applied to said first liquid portion of compression liquid at a location remote from its one of said opposed meniscuses and in a direction toward the second portion of compression liquid, thereby to move the former and its meniscus toward the other opposing meniscus.

3. A gauge for measuring the absolute pressure of an attenuated gaseous fluid, which gauge comprises a pressure measuring capillary that can be vertically positioned and serves as a conduit which lets flow through it a compressing liquid used to compress the gaseous fluid, and at each of its ends communicates with a separate other conduit respectively; a pressure level indicating scale adjacent said capillary and having its zero indicating line near the top of the vertical run of said capillary which latter is adapted to confine a portion of the compressing liquid to serve to indicate pressure level along said capillary, and to allow the gaseous fluid as compressed to enter its vertical run and depress the pressure level indicating liquid to a lower level corresponding to pressure increase on the gaseous fluid; a first conduit to communicate with the source of the attenuated gaseous fluid; a compression chamber wherein said gaseous fluid is to be compressed and communicating from one location with said first conduit to receive therefrom a measured quantity of the gaseous fluid, and communicating at another location with said measuring capillary; a second conduit having one end communicating with the measuring capillary at a level about the lower end of its indicating scale and open at its other end to communicate with the attenuated gaseous fluid source; means for selectively causing the introduction of an amount of the original attenuated gas into the compression chamber and for increasing the pressure of said gas.

4. In a gauge for measuring the absolute pressure of an attenuated gaseous fluid, a compression chamber into which to introduce a measured quantity of said gaseous fluid at its initial unknown pressure; a first conduit to communicate with the source of said gaseous fluid and the compression chamber; a joining length conduit communicating with said first conduit and the compression chamber; means for introducing the initial quantity of the attenuated gaseous fluid into the compression chamber and for thereafter producing increased pressure on said gaseous fluid, which means comprises a reservoir for confining a compression liquid and connected at its upper end with said joining length conduit and closed at its lower end by a fluid-tight yet removable closure; a piston longitudinally axially movable within said reservoir and entirely peripherally in fluid-tight engagement with the inside wall thereof thereby to serve as a so movable supporting bottom for compression liquid to be held in the reservoir; a piston rod attached to the underside of said piston and extending in fluid-tight and longitudinally axially movable relationship through said closure; and means below said reservoir and its closure adapted to enable said piston rod with said piston attached to it to be raised and lowered within said reservoir.

5. The means for introducing gaseous fluid into the compression chamber of a gauge as claimed in claim 4, and of compressing said fluid therein, wherein the means to enable raising and lowering the piston rod and its attached piston comprises a sleeve-stud anchored to and depending from the bottom closure of, and communicating therethrough with, said reservoir; a handle attached to the lower end of the piston rod; and disengageable inter-engaging means on the exposed part of said sleeve-stud and on said handle respectively, which when disengaged allow the piston rod to be slid readily through its fluid-tight engagement with said closure for corresponding relatively easy and freer translation of the piston and which when engaged hold the piston rod and its attached piston to enable longitudinally axially moving it under more controlled, slower and smaller increments of translation thereof.

6. In the means in a gauge, as claimed in claim 4, wherein the piston is held peripherally in fluid-tight engagement with the inside wall of said reservoir by a fluid-tight sealing ring held snugly tightly between said inside wall and an annular groove in the vertical periphery of the piston.

7. A fluid-tight and removable closure for a reservoir of the means as claimed in claim 4, wherein the reservoir has an outwardly extending flange at its open lower end and the bottom-most surface thereof is flat and rests on the flat top surface of an adapter-support, and the latter has an annular groove in its top surface and positioned to be located under said flange, and a compressible fluid-tight sealing ring is clamped tightly in said groove by said flange which is held firmly tight against the top of said adapter-support by retaining means that engage the latter and also evenly engage the top of said flange and thereby enable it and the adapter-support to be firmly drawn toward one another.

8. In a means in a gauge, as claimed in claim 1, wherein the piston rod extends in fluid-tight relationship through said closure by its being fluid-tightly encircled by a fluid-tight sealing ring flanked on each side by a plastic ring that has a friction-free outer surface, and which combination of said rings is seated in a central bore extending through said closure.

References Cited in the file of this patent

UNITED STATES PATENTS

| | | |
|---|---|---|
| 2,696,105 | Mackas | Dec. 7, 1954 |
| 2,950,928 | Bowan | Aug. 30, 1960 |

FOREIGN PATENTS

| | | |
|---|---|---|
| 298,875 | Great Britain | Oct. 28, 1928 |
| 592,379 | Great Britain | Sept. 16, 1947 |

OTHER REFERENCES

Publication: Manostat Corp. of New York Bulletin VG "New Open End McLeod Gauge," 2 pages, copyright 1959, copy received June 6, 1960 in Div. 36.

UNITED STATES PATENT OFFICE
CERTIFICATE OF CORRECTION

Patent No. 3,145,569                                  August 25, 1964

Roger Gilmont

It is hereby certified that error appears in the above numbered patent requiring correction and that the said Letters Patent should read as corrected below.

In the grant, lines 2 and 11, and in the heading to the printed specification, line 4, for "Monostat", each occurrence, read -- Manostat --; column 3, line 40, for "working" read -- workable --; column 4, line 13, for "silicon" read -- silicone --; line 70, for "millimeter" read -- milliliter --; column 6, line 19, for "coresponding" read -- corresponding --; column 8, line 72, for the claim reference numeral "1" read -- 4 --.

Signed and sealed this 12th day of January 1965.

(SEAL)
Attest:

ERNEST W. SWIDER                                EDWARD J. BRENNER
Attesting Officer                                         Commissioner of Patents